United States Patent [19]

Kalfas

[11] 4,395,053
[45] Jul. 26, 1983

[54] ELECTRIC CORD SUPPORT BRACKET ASSEMBLY FOR LAWNMOWERS AND THE LIKE

[76] Inventor: Paul P. Kalfas, 2735 S. Christiana Ave., Chicago, Ill. 60623

[21] Appl. No.: 256,916

[22] Filed: Apr. 23, 1981

[51] Int. Cl.³ .............................................. B62B 11/00
[52] U.S. Cl. .................................. 280/47.34; 248/52; 56/16.7; 191/12 R; 403/395
[58] Field of Search .................... 191/12.2 R, 12.2 A, 191/12 R; 280/47.34, 289 R, 47.37 R; 248/51, 52, 329, 330.1, 339–341, 73, 74 R, 218.4, 539, 441 C, 534, 230, 225.4; 56/10.5, 11.8, 12.6, 15.4, 16.7; 200/157; 403/395; 180/19.1–19.3, 19 R; 339/101, 119 C

[56] References Cited

U.S. PATENT DOCUMENTS

| | | | |
|---|---|---|---|
| 1,493,799 | 5/1924 | Blei | 248/51 |
| 1,802,358 | 4/1931 | Smith | 191/12 R |
| 2,208,358 | 7/1940 | Chandler | 248/539 |
| 2,633,688 | 4/1953 | Yeck | 56/10.5 |
| 2,760,328 | 8/1956 | Siebring | 56/16.7 |
| 2,775,087 | 12/1956 | Abel | 56/16.7 |
| 3,375,338 | 3/1968 | Delf | 200/157 |

Primary Examiner—David M. Mitchell
Assistant Examiner—Timothy Roesch
Attorney, Agent, or Firm—Tilton, Fallon, Lungmus

[57] ABSTRACT

An electric cord support bracket assembly for lawnmowers, snowblowers, lawn edgers, and other wheeled implements having push handles for directing their movement by users walking therebehind. The bracket assembly includes a clamp adapted to be secured to the tubular handle of the implement, a generally vertical rod or standard secured at its lower end to the clamp, and a cord guide at the upper end of the rod. The guide preferably takes the form of an S-shaped portion oriented with its loops facing upwardly and downwardly, and the length of the rod is such that the power cord is directed and supported over the user's shoulder by the loops of the guide.

5 Claims, 4 Drawing Figures

U.S. Patent  Jul. 26, 1983  4,395,053
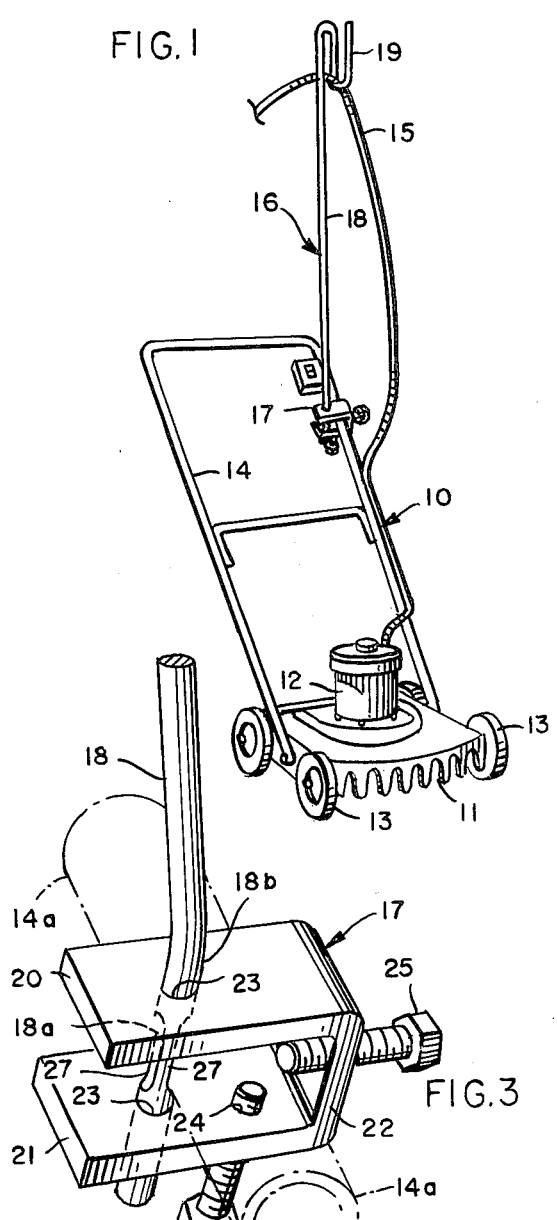
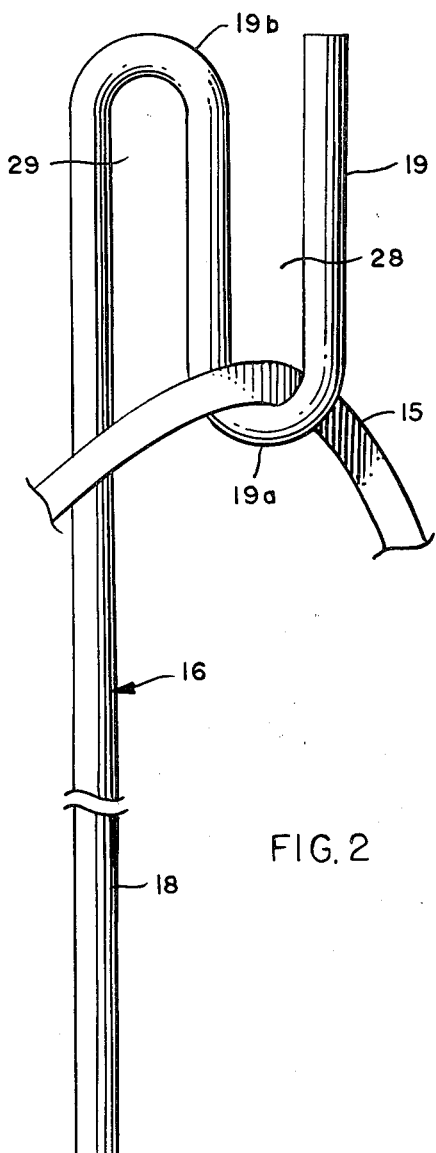
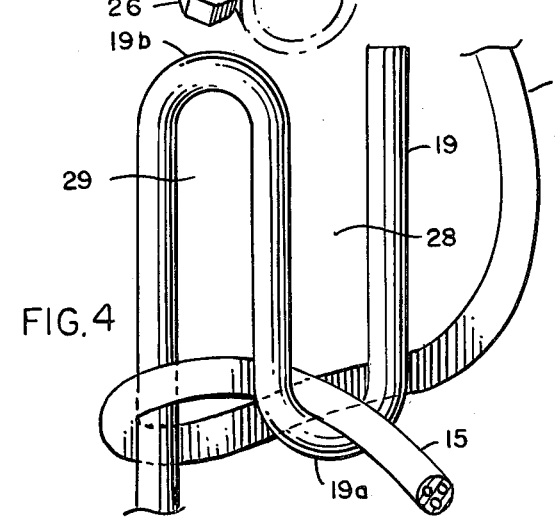
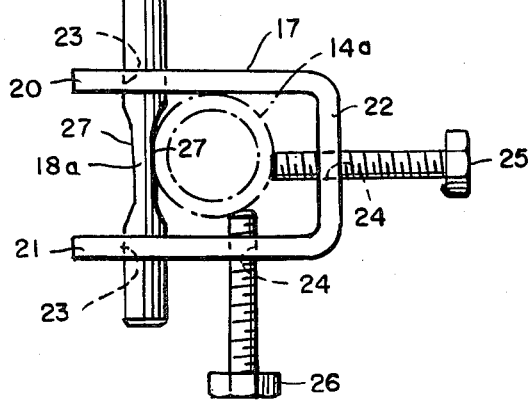
FIG. 1
FIG. 2
FIG. 3
FIG. 4

ELECTRIC CORD SUPPORT BRACKET ASSEMBLY FOR LAWNMOWERS AND THE LIKE

BACKGROUND AND SUMMARY

Despite their convenience and quiteness of operation, electric-powered implements such as lawnmowers, snowblowers, edgers and the like have the common disadvantage that their electric power cords tend to get in the way of implement operation and become tangled, damaged, or even severed. While a spring-driven wind-up reel might be provided to eliminate excess cord and reduce the possibilities of tangling, there would still be a danger that the cord might become cut by the blades of the device or twisted about the implement's operating shaft. Such occurrences not only render the implement inoperative but also present a significant risk of possible injury to the user.

One aspect of this invention lies in the discovery that such problems may be eliminated or greatly reduced by providing a bracket assembly which direct the power cord upwardly and rearwardly away from the motor of the implement and over the shoulder of the user. Not only is the cord supported away from the ground in the immediate vicinity of the wheeled implement, but, because it extends over the user's shoulder, is positioned to permit minimum interference with turning movement of the machine (and user) in one direction or the other. The result is a relatively simple but highly effective device for facilitating the operation of AC-powered lawnmowers and other wheeled implements equipped with push handles.

In brief, the bracket assembly takes the form of a C-shaped clamp having a pair of arms spaced apart a distance sufficient to receive a portion of a standard tubular handle therebetween. A pair of set screws extend at right angles through the clamp and are directly engagable with the portion of the tubular handle received between the arms of the clamp. One of the screws extends through the base of the clamp so that as it is tightened the handle tubing tends to be urged in a direction away from the base towards the free ends of the clamp's arms. The arms are provided with openings through which the lower end of an elongated support rod or standard extends; therefore, the tightening of the base screw not only urges the tubular handle portion into tight locking engagement with the lower portion of the rod, but also secures the rod within the openings of the clamp. The set screws therefore constitute simple but highly effective locking means for simultaneously securing the clamp to a handle formed of any of a wide variety of standard-sized tubular members and also locking the support rod to both the clamp and the handle in a selected position of adjustment depending on the height and preference of the user. In a preferred embodiment, the portion of the support rod extending between the arms of the clamp is provided with an indentation or arcuate recess which receives a portion of the curved wall of the tubular handle, thereby increasing the security of the interlock between the parts and also reducing the possibility that the rod might slide or twist with respect to the clamp during operation of the implement.

The length of the rod or standard should fall within the range of approximately 26 to 38 inches, the preferred length being approximately 30 to 34 inches. At its upper end, the upstanding rod is provided with guide means in the form of an S-shaped bend in the rod, the "S" being oriented so that one of the loops faces upwardly and the other is directed downwardly. The upwardly-opening loop acts as a support for the power cord, guiding the cord from the point of attachment to the implement in a direction upwardly and over the shoulder of the user. By passing the cord through the downwardly-facing loop as well as the upwardly-facing loop, the cord is effectively restrained against upward movement that might result in release of the cord by the guide means.

Ordinarily, the clamp of the bracket assembly is secured to a portion of the tubular handle that slopes upwardly and rearwardly from the wheeled housing of the implement. The point of attachment is selected so that the upper end of the rod will be located just above and directly in front of the user's shoulder. Since the rod is formed of steel or other durable but bendable material, the user, after attaching the support rod to the bracket in the manner described, may then bend the rod in the vicinity of the bracket to insure that the rod will be disposed generally vertically when the implement is in use.

Other features, objects, and advantages of the bracket assembly will become apparent from the specification and drawings.

DRAWINGS

FIG. 1 is a perspective view of an electric mower equipped with the electric cord support bracket assembly of the present invention.

FIG. 2 is an elevational view of the assembly showing the relationship between the clamp and rod before the rod is bent to insure generally vertical orientation in use.

FIG. 3 is an enlarged fragmentary perspective view illustrating the clamp and rod when oriented as generally depicted in FIG. 1, but with the tubular frame of the mower shown in phantom for clarity of illustration.

FIG. 4 is a fragmentary view of the upper end of the support rod, the view being similar to FIG. 2 but showing utilization of the downwardly-facing loop of the guide structure.

DETAILED DESCRIPTION

Referring to the drawings, the numeral 10 represents a conventional electric lawnmower having a housing 11, motor 12, wheels 13, and push handle 14 of tubular construction. An electric power cord 15 extends from motor 12 and is equipped at its opposite end with a conventional plug (not shown) for insertion into an AC outlet. A lawnmower has been selected only for illustrative purposes and it is to be understood that the support bracket assembly of this invention may be used with other wheeled implements equipped with push handles and powered by AC motors such as, for example, snowblowers, lawn edgers, leaf blowers and mulchers, power sweepers, and the like.

Push handle 14 typically slopes rearwardly and upwardly and is formed of tubular stock, commonly chrome-plated steel tubing of approximately 0.75 inches outside diameter. In the illustration given, the handle is rectangular in outline but other configurations, such as a T-shaped configuration, may be provided. The particular configuration is not critical, but it is essential that the push handle be formed of rigid tubular material having an outside diameter within the general range of about 0.5 to 1.0 inches.

The support assembly is designated generally by the numeral 16 and includes a clamp 17, an upstanding support rod 18, and guide means 19 for supporting and guiding power cord 15. Referring to FIGS. 2 and 3, it will be observed that clamp 17 is generally C-shaped, having parallel upper and lower arms 20 and 21 joined by an integral connecting portion or base portion 22. Aligned openings 23 are provided in arms 20 and 21. Such openings are spaced from connecting portion 22 a distance approximating the spacing between the two arms. It has been found that a distance of one inch is suitable since that allows the clamp to receive tubular members of up to one inch outside diameter; however, slightly smaller or greater dimensions may be provided as required.

The connecting portion 22 and at least one of the arms 20, 21 are provided with threaded openings 24 receiving set screws 25 and 26. It will be observed from FIG. 2 that opening 24 in arm 21 is located approximately midway between connecting portion 22 and opening 23; hence, if the tubular handle portion 14a extending through the opening of the clamp were one inch in outside diameter, and the spacing between the arms were also approximately the same size, set screws 25 and 26 would extend generally radially, and at 90° angles, with respect to the tubular handle member. However, as indicated in the drawing, the tubing generally used for such handles is usually smaller than one inch in outside diameter (¾ of an inch is typical), and therefore the axes of screws 25 and 26 would be offset slightly from radial alignment with tube portion 14a.

The vertical rod or standard 18 is formed of steel or other rigid and durable material. The lower end portion 18a of the rod extends through aligned openings 23 in the arms of clamp 17 and, as shown most clearly in FIG. 2, such portion is preferably provided with an indentation or recess 27 facing towards connecting portion 22 of the clamp. In the embodiment illustrated, two such indentations 27 are disposed on diametrically opposite sides of the rod to permit greater selectivity in the mounting of the rod with respect to the handle; however, it will be understood that only one of the recesses is used in any given installation. The axial dimension of each indentation or recess approximately matches the length of the arc of contact with the largest tubular member 14a receivable within the opening of the clamp. Tightening of screws 25 and 26 forces tubular portion 14a into tight engagement with the recessed portion of the rod 18, thereby performing the multiple functions of securing the clamp to tubular handle portion 14a, locking rod 18 against axial movement through the openings 23 of the clamp, and also locking rod 18 against rotation within openings 23.

The guide means 19 at the upper end of upstanding rod 16 takes the form of an S-shaped extension of the rod within the "S" being oriented so that one of the loops 19a has an upwardly-facing opening 28 and the other of the loops 19b has a downwardly-facing opening 29. Cord 15, extending upwardly from electric motor 12, may be supported only within the upwardly-facing opening 28 (FIG. 2) when temporary support of the cord is desired. When more secure support is preferred, the cord may also be extended through opening 29 (FIG. 4), thereby preventing the cord from being lifted free of guide means 19.

To mount the support bracket assembly, the user simply selects a portion of tubular handle 14 to be received within clamp 17, inserts the lower end of the rod 18 through the openings 23 of the clamp, and then tightens set screws 25 and 26. The location of the clamp upon the handle should be selected so that in use of the implement, when the operator is standing behind the handle in operating position, the cord-supporting guide means 19 will be disposed at an elevation at least as high as the operator's shoulders. To achieve such an objective, it has been found that rod 18 should have a total length within the range of approximately 26 to 38 inches, the preferred length being approximately 30 to 34 inches.

In most instances clamp 17 will be secured to an upwardly and rearwardly sloping tubular member in such a way that openings 23 of the clamp are not vertically aligned (FIGS. 1 and 3). Proper installation of the support bracket assembly requires that rod 18 extend generally vertically when the implement 10 is in use; hence, following attachment of clamp 17 in the manner described, a user will normally find it necessary to bend rod 18 in a zone 18b directly above the clamp so that vertical orientation of the main portion of the rod, when the implement is in use, will be achieved (FIG. 3).

While in the foregoing an embodiment of the invention has been disclosed in considerable detail for purposes of illustration, it will be understood by those skilled in the art that many of these details may be varied without departing from the spirit and scope of the invention.

I claim:

1. A bracket assembly for supporting the electric power cord of a wheeled electric implement having a push handle of tubular construction, comprising a clamp having an opening for receiving a tubular portion of said handle and having screw fasteners for securing said clamp in place; a generally rigid and vertically-extending rod having a lower end secured to said clamp and a length sufficient to locate the upper end thereof at least as high as the shoulder of a user holding said push handle in normal operation of said implement; and guide means at the upper end of said rod for supporting and guiding the power cord of said implement upwardly over a user's shoulder, said clamp being generally C-shaped and having a pair of parallel arms joined by an integral connecting portion; said arms being spaced apart to receive said tubular portion of said handle therebetween; said arms being provided with a pair of aligned openings adjacent the free ends thereof for receiving the lower end portion of said rod; said screw fasteners being threadedly mounted upon said clamp to engage said tubular portion of said handle and to urge the same into tight locking engagement with said clamp and the portion of said rod between said arms when said fasteners are tightened, said portion of said rod between said arms being provided with a recess facing towards said connecting portion of said clamp and adapted to receive an arcuate portion of said tubular portions of said handle, whereby, upon tightening of said fasteners against said tubular portion of said handle, said rod is locked against both axial and rotational movement relative to said clamp.

2. The assembly of claim 1 in which at least two of said screw fasteners are provided; one of said fasteners extending through a threaded opening in said connecting portion of said clamp and the other of said screw fasteners extending through a threaded opening in one of said arms.

3. The assembly of claim 2 in which the distance between said arms, and the distance between said aligned openings and said connecting portion of said clamp, is about one inch.

4. The assembly of claim 3 in which said threaded opening in said one arm is about midway between said connecting portion and said rod.

5. The assembly of claim 1 in which said rod has a length within the range of about 26 to 38 inches.

* * * * *